Aug. 23, 1966  J. J. DUDDY  3,268,111
BUTTER DISH
Filed July 14, 1964
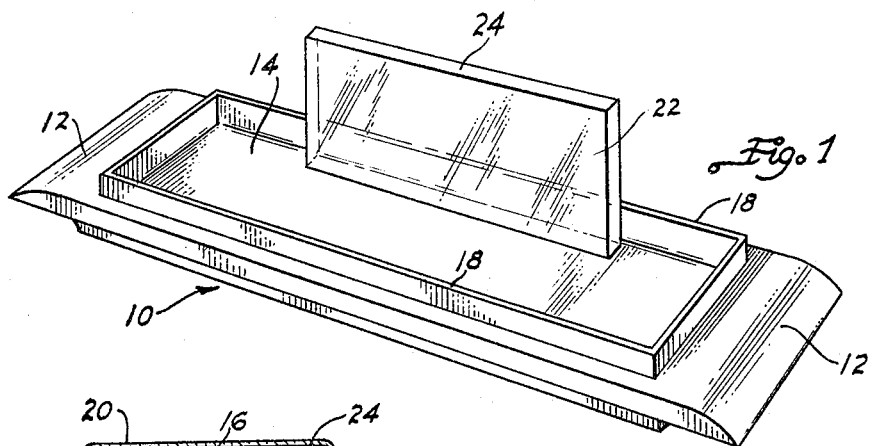
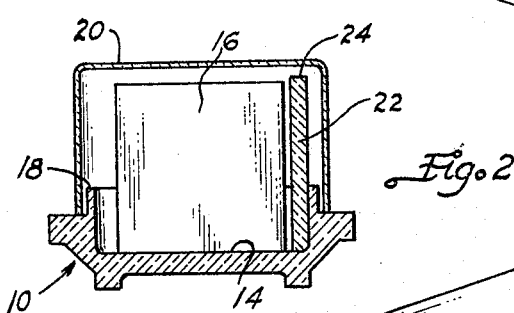
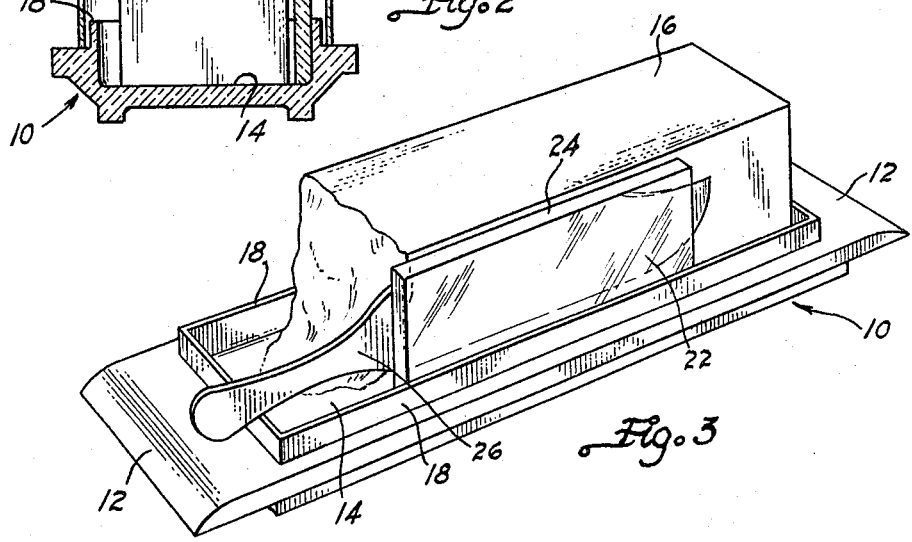
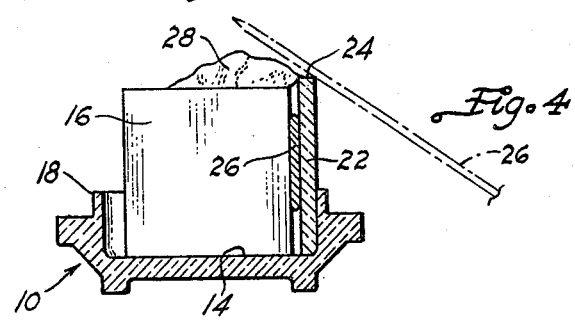
INVENTOR.
JAMES J. DUDDY
BY
ATTORNEY 3,268,111
BUTTER DISH
James J. Duddy, 514 N. Metcalf St., Lima, Ohio
Filed July 14, 1964, Ser. No. 382,552
2 Claims. (Cl. 220—90)

This invention pertains to a butter dish and, more particularly, to the addition of certain means to a conventional butter dish to render it more practical as will be described hereinafter.

Many types of butter dishes are available at present and particularly a type designed to hold a so-called quarter pound cube, stick or block of butter. Such sticks or blocks are approximately five inches long and slightly more than one square inch in cross-section. For convenience, they normally are sold in individually wrapped condition within a carton holding four of such quarter pound sticks or blocks.

Conventional butter dishes conveniently hold one of such quarter pound sticks or blocks so as to be covered by a removable cover engageable with the dish, whereby the quarter pound stick of butter, or any unused portion thereof, readily may be covered and stored in a refrigerator until it is desired to next use the same.

Such conventional types of butter dishes frequently are made in attractive motif, whereby when the cover is removed, such dish and butter thereon may be placed upon the dining table without need to remove the butter from said dish and place it upon any other suitable type of dish. Notwithstanding this however, there normally is so little additional area provided upon conventional dishes of the aforementioned type in addition to that required to hold the stick or block of butter, that it is most difficult to maintain a butter knife on the dish along with the stick or block of butter, at least in such manner that it does not readily fall from the dish especially when being passed from one occupant of the dining table to another.

Another disadvantage of said conventional butter dishes is that, it is not infrequent that more butter is removed from the cube or stick by a knife than is required to butter a slice of bread, for example, especially when preparing sandwiches or the like, and it is desired to return to the cube or stick the butter remaining upon the knife and not needed at the moment. Especially if the cube or stick of butter is relatively soft, it is practically impossible to wipe the butter remaining upon the knife onto the cube or stick of butter upon the dish in any satisfactory manner which does not result in the cube or stick becoming badly squashed and, not infrequently, the knife actually picks up more butter from the cube or stick than was on it originally.

It is the principal object of the present invention to obviate the foregoing difficulties and, particularly by the utilization of a single additional element upon a butter dish, means are provided both for satisfactorily positioning a butter knife on the dish in such manner that it will not readily or accidentally fall therefrom, and also provide rigid means disposed adjacent a cube or stick of butter upon the dish and arranged to form a stiff wiping edge over which a knife may be drawn for purposes of scraping therefrom any excess butter upon the knife and disposing such excess butter directly upon the cube or stick of butter upon the dish.

Details of the foregoing objects and of the invention, as well as other objects thereof, are set forth in the following specification and illustrated in the accompanying drawing comprising a part thereof.

In the drawing:

FIG. 1 is a perspective view of an exemplary butter dish embodying additional means comprising the present invention, no cover being shown on the butter dish in this view.

FIG. 2 is a cross-sectional view of the butter dish shown in FIG. 1, as viewed on the line 2—2 thereof but also showing in similar cross-sectional manner, an exemplary cover for the butter dish and said view also showing an exemplary cube or stick of butter positioned in the dish and enclosed by the cover.

FIG. 3 is a perspective view of the butter dish shown in FIGS. 1 and 2 and illustrated with a partially consumed cube or stick of butter thereon, an exemplary butter knife also being shown operatively positioned against accidental falling from the dish by means of being disposed between the cube of butter and the attachment clearly shown in FIGS. 1 and 2.

FIG. 4 is a transverse sectional view similar to FIG. 2 but not illustrating the cover positioned on the butter dish and, in broken lines, a fragmentary portion of a butter knife is shown in the process of being wiped against the upper edge of the attachment to the butter dish shown in the preceding figures.

Referring to the drawing, the present invention comprises a butter dish 10 which may be formed from any suitable material such as any of a wide number of different types of plastics, metal, china, glass or the like, any of which are readily susceptible to being molded and thereby being capable of inexpensively forming the butter dish 10 in attractive and aesthetic configurations. The dish preferably is provided with opposite ends 12 to facilitate the handling of the dish. Also, substantially centrally of the dish is a shallow recess 14 which preferably is substantially flat to receive a cube or stick of butter 16, such as a quarter pound cube or stick thereof.

The shallow recess 14, which is rectangular, is defined by substantially vertical flange means 18 which preferably extend above the upper surface of the peripheral portions of the butter dish 10 so as to serve the dual function of not only positioning the butter 16 accurately upon the dish 10 but also provide upstanding means, as best illustrated in FIG. 2, for purposes of positioning the lower edges of the sides and ends of a cover 20 for the butter dish. The cover 20 may be provided with any suitable decoration and otherwise be aesthetic in nature and may be formed from any of the same materials as referred to above from which the dish 10 may be formed. As shown in FIG. 2 particularly, there preferably is a limited amount of clearance between the interior peripheral edge of the open bottom of the cover 20 and the exterior walls of the flange means 18. Also, the cover 20 is of ample height readily to accommodate the cube or stick of butter 16 therein without contacting the same with the inner surface of the cover.

In accordance with the principles of the present invention, a vertical rib 22 is affixed to the butter dish 10 preferably within the confines of the flange means 18 which defines the shallow recess 14. The rib 22 may be either formed integrally with the butter dish at the time it is molded and from the same material as the butter dish or such a vertical rib may be added initially as a separate element to previously manufactured butter dishes and affixed thereto by any appropriate means such as cementing or the like so as preferably to be irremovably connected thereto. If preferred, the vertical rib 22 may comprise a portion of the vertical flange means 18 and merely extend upwardly from the upper edge of the normal portions of the flange means.

Preferably, the vertical rib 22 is relatively thin so as not to occupy any abnormal amount of space within either the shallow recess 14 or the interior of the cover 20. However, it should be sufficiently thick to afford adequate rigidity for the purposes to be described below.

The upper edge 24 of the rib 22 likewise preferably is substantially straight, parallel to the plane of the recess 14, and approximately as high as the conventional cube or stick of butter intended to be contained within the butter dish, as shown in FIGS. 2-4 for example, such height being of the order of approximately one inch. By so arranging the rib 22 and the upper edge 24 thereof, it is possible to dispose the blade of a butter knife 26 between the cube of butter 16 and the vertical rib 22 as clearly shown in FIGS. 3 and 4, thereby very satisfactorily positioning the butter knife upon the butter dish 10 by means not heretofore available. The employment of the vertical rib 22 for such purpose however has an additional benefit, illustrated in FIG. 4, wherein it will be seen that the butter knife 26 is shown in process of being angularly wiped across the upper edge 24 of the rib 22 so as to remove excess butter 28 from the knife 26, effectively, and also to dispose such excess butter directly upon the top of the cube or stick of butter 16. By such means, the knife is maintained clean, no butter is wasted, the remainder of the cube or stick of butter 16 on the dish 10 is not squashed or otherwise disarranged, and if the excess butter 28 is sufficiently distributed along the top of the cube 16, which readily is possible in view of the substantial length of the vertical rib 22, such excess amount of butter may be disposed readily between the top of the cube 16 and the inner surface of the top wall or the cover 20 without engaging the same.

From the foregoing, it will be seen that the present invention, through the simple addition of a preferably integral attachment comprising a vertical rib 22 which, in the preferred construction, is substantially at least half as long as the recess 14, not only serves as an effective positioning means for a butter knife upon a butter dish, but also affords rigid means for readily removing excess butter from a knife and depositing the same upon the top of the remainder of a cube or stick of butter upon the butter dish, regardless of whether the butter upon the dish is relatively hard or soft. Also, the addition of such vertical rib to a butter dish does not render the same unattractive, nor does it in any way render the butter dish less capable of quickly being cleansed than any normal butter dish.

While the invention has been described and illustrated in its several preferred embodiments, it should be understood that the invention is not to be limited to the precise details herein illustrated and described since the same may be carried out in other ways falling within the scope of the invention as claimed.

I claim:

1. A dish for holding a rectangular block of butter substantially square in cross-section and of the order of approximately one inch high, said dish comprising a bottom having a rectangular central portion complementary in shape to such block of butter to receive and support it, flange means extending laterally outwardly from said central portion, a vertical rib fixed to and extending along one side of said central portion of said dish adjacent said flange means and the upper edge thereof being substantially straight and parallel to said central portion and of the order of approximately one inch in height, thereby being at least as high as the height of the block of butter to be placed upon said dish and parallel to said dish, said rib also being at least substantially half as long as said rectangular central portion of said bottom of said dish, whereby said rib serves as positioning means to support a knife vertically to the central portion of said dish when placed between said rib and a block of butter when supported by said plate and the upper edge of said rib serving as a wiping edge to remove butter from said knife, vertical flange means extending around the perimeter of said central portion of said bottom of said dish and upwardly therefrom a short distance substantially less than the height of a block of butter of conventional size to define a shallow rectangular recess to receive said block of butter, and a cover having an open bottom shaped and of suitable dimensions to extend over and cover a block of butter when positioned within said recess, the lower edges of said cover freely engaging the outer surfaces of said flange means to position and cover relative to said dish and said vertical rib extending upward from said dish within the confines of said flange means to a height less than the interior height of said cover, whereby said rib will be contained within said cover when the latter is mounted operatively in covering position upon said dish.

2. The dish for holding butter according to claim 1 in which said vertical rib is immediately adjacent and parallel to one elongated side of the vertical flange means.

References Cited by the Examiner

UNITED STATES PATENTS

| | | | |
|---|---|---|---|
| 12,876 | 5/1855 | Stimnson | 312—236 |
| 183,283 | 10/1876 | Cate | 312—284 |
| 685,938 | 11/1901 | Page | 220—1 |
| 2,080,283 | 5/1937 | Lowenfels | 220—97 |
| 2,406,669 | 8/1946 | Daniels | 312—284 |
| 2,530,910 | 11/1950 | Schnabel | 312—284 |
| 2,563,157 | 8/1951 | Castelli | 206—45.14 |

THERON E. CONDON, *Primary Examiner.*

RAPHAEL H. SCHWARTZ, *Examiner.*